(12) United States Patent
Yang

(10) Patent No.: US 10,247,439 B2
(45) Date of Patent: Apr. 2, 2019

(54) CONTROL MECHANISM FOR AN AIR CONDITIONING SYSTEM

(71) Applicant: Chih-Hsiang Yang, Taipei (TW)

(72) Inventor: Chih-Hsiang Yang, Taipei (TW)

( * ) Notice: Subject to any disclaimer, the term of this patent is extended or adjusted under 35 U.S.C. 154(b) by 16 days.

(21) Appl. No.: 15/703,658

(22) Filed: Sep. 13, 2017

(65) Prior Publication Data

US 2018/0209673 A1  Jul. 26, 2018

(30) Foreign Application Priority Data

Jan. 20, 2017  (TW) .............................. 106102032 A

(51) Int. Cl.
| | | |
|---|---|---|
| *F24F 11/30* | (2018.01) | |
| *G05D 23/19* | (2006.01) | |
| *F24F 5/00* | (2006.01) | |
| *F24F 11/65* | (2018.01) | |
| *F24F 11/46* | (2018.01) | |
| *F24F 11/88* | (2018.01) | |
| *G01J 1/42* | (2006.01) | |
| *F24F 11/89* | (2018.01) | |
| *F24F 140/20* | (2018.01) | |
| *F24F 110/00* | (2018.01) | |
| *F24F 130/20* | (2018.01) | |

(52) U.S. Cl.
CPC ............ *F24F 11/30* (2018.01); *F24F 5/0046* (2013.01); *F24F 11/46* (2018.01); *F24F 11/65* (2018.01); *F24F 11/88* (2018.01); *G05D 23/1924* (2013.01); *F24F 11/89* (2018.01); *F24F 2005/0064* (2013.01); *F24F 2110/00* (2018.01); *F24F 2130/20* (2018.01); *F24F 2140/20* (2018.01); *G01J 2001/4266* (2013.01)

(58) Field of Classification Search
CPC ........ F24F 11/30; F24F 11/89; F24F 2110/00; F24F 2130/20; F24F 2140/20; G05D 23/1927; G05D 23/27; G01J 2001/4266
See application file for complete search history.

(56) References Cited

U.S. PATENT DOCUMENTS

| | | | | |
|---|---|---|---|---|
| 4,012,920 A | * | 3/1977 | Kirschbaum | ............. F24F 5/00 126/400 |
| 4,165,036 A | * | 8/1979 | Meckler | .................. F24F 3/001 237/1 R |
| 4,339,930 A | * | 7/1982 | Kirts | ................... F24D 19/1075 126/585 |

* cited by examiner

*Primary Examiner* — Marc E Norman

(74) *Attorney, Agent, or Firm* — Hamre, Schumann, Mueller & Larson, P.C.

(57) ABSTRACT

A control mechanism for controlling an air conditioning system includes an optical sensor and an energy controller. The air conditioning system includes a solar power module, an outdoor unit, a fan, and a storage device containing a first liquid. The optical sensor detects sunlight received by the solar power module. The energy controller controls the outdoor unit based on luminance and temperature of the sunlight, an operation state of the fan, an operation state of the outdoor unit, a temperature of the first liquid, a flow speed of a second liquid in a conduit between the storage device and the fan, and temperatures of the second liquid at different portions of the conduit.

14 Claims, 11 Drawing Sheets

CONTROL MECHANISM FOR AN AIR CONDITIONING SYSTEM

CROSS-REFERENCE TO RELATED APPLICATION

This application claims priority of Taiwanese Patent Application No. 106102032, filed on Jan. 20, 2017.

FIELD

The disclosure relates to a control mechanism, and more particularly to a control mechanism for controlling an air conditioning system.

BACKGROUND

Air conditioning systems have become progressively more engaged with the daily lives of modern population due to the constant rise in air temperature. A conventional air conditioning system includes an air conditioner outdoor unit, and an indoor unit disposed in an indoor space, which is the space in which air conditioning is intended. It is typically desirable to maintain a designated temperature for the indoor space. To achieve that, the air conditioner outdoor unit is configured to switch between an active state and an inactive state. Nonetheless, frequent switching between the active and inactive states may be relatively energy consuming.

SUMMARY

One object of the disclosure is to provide a control mechanism for controlling a conventional air conditioning system.

According to the disclosure, the air conditioning system includes a solar power module for converting sunlight into electrical energy, an air conditioner outdoor unit electrically connected to and powered by the solar power module, a storage device containing a first liquid for performing heat exchange with the air conditioner outdoor unit via a first conduit loop, a temperature sensor for detecting a temperature of the first liquid in the storage device, and a fan for distributing conditioned air that exchanges heat with the storage device via a second liquid through a second conduit loop. The control mechanism includes an optical sensor and an energy controller.

The optical sensor is configured to be disposed close to the solar power module for detecting a luminance and a temperature of the sunlight received by the solar power module.

The energy controller is electrically connected to the optical sensor, and is configured to be electrically connected to the solar power module, the air conditioner outdoor unit and the temperature sensor. The energy controller is capable of controlling an operation state of the air conditioner outdoor unit to switch between an active state and an inactive state based on the luminance and the temperature of the sunlight detected by the optical sensor, an operation state of the fan, the operation state of the air conditioner outdoor unit, a flow speed of the second liquid in the second conduit loop, a first temperature of the second liquid at a portion of the second conduit loop where the second liquid flows out of the storage device, a second temperature of the second liquid at a portion of the second conduit loop where the second liquid flows into the storage device, and a relation among the temperature of the first liquid sensed by the temperature sensor and a first threshold temperature, a second threshold temperature and a third threshold temperature.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
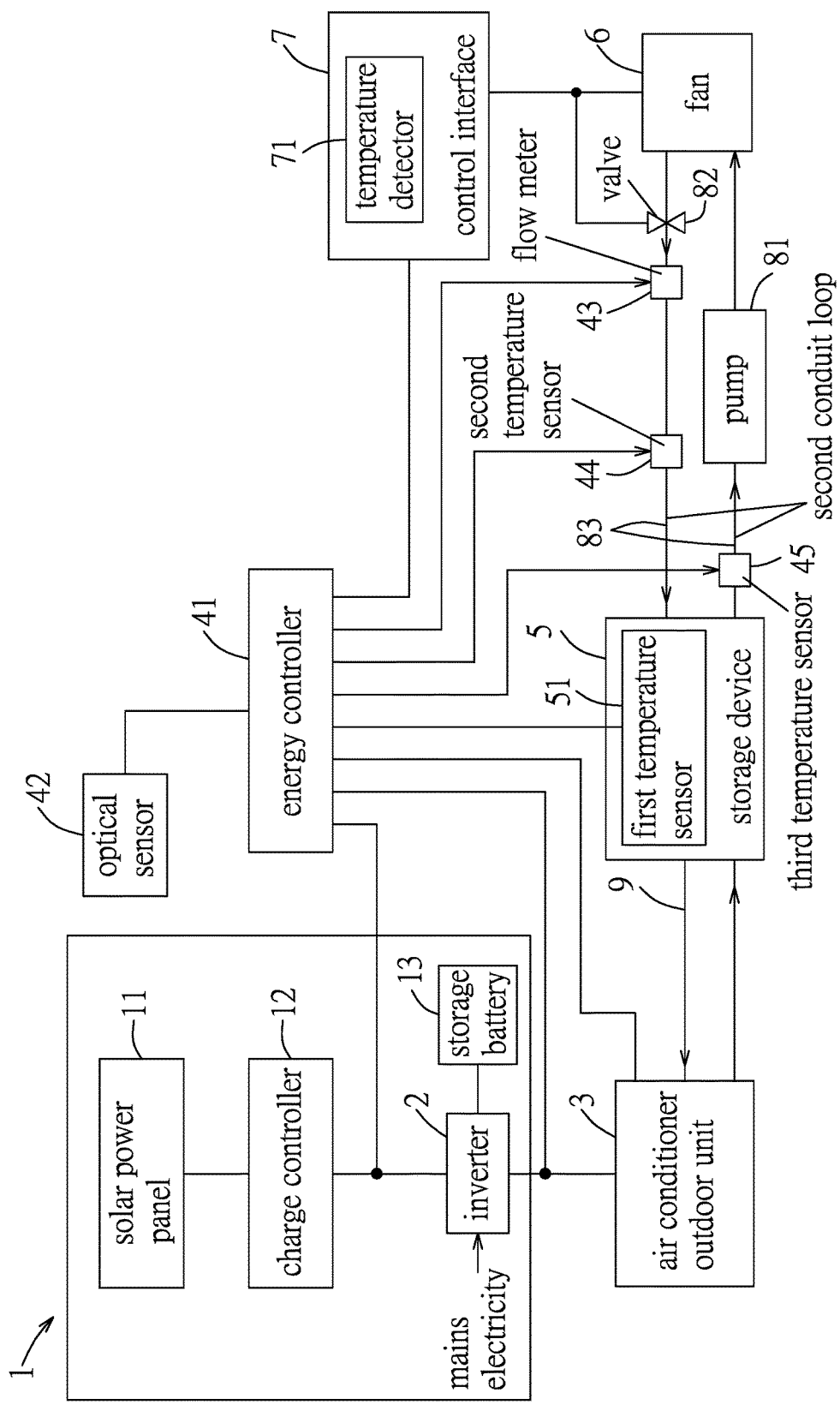
FIG. 1 is a block diagram illustrating a control mechanism for controlling an air conditioning system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a control mechanism 4 for controlling an air conditioning system, according to one embodiment of the disclosure. The air conditioning system includes a solar power module 1, an air conditioner outdoor unit 3, a storage device 5, a fan 6, a control interface 7, a pump 81 (e.g., a circulating pump), a valve 82, a flow meter 43, a first temperature sensor 51, a second temperature sensor 44 and a third temperature sensor 45.

The solar power module 1 is capable of converting sunlight into electrical energy, and includes a solar power panel 11, a charge controller 12, a storage battery 13 and an inverter 2.

The solar power panel 11 is exposed for receiving sunlight, and generates a direct current. The charge controller 12 interconnects the solar power panel 11 and the inverter 2, and is configured to transmit the direct current from the solar power panel 11 to the inverter 2. The inverter 2 is electrically connected to the storage battery 13, and is configured to provide the direct current to the storage battery 13 so as to charge the storage battery 13. Moreover, the inverter 2 is electrically connected to the air conditioner outdoor unit 3, and is configured to convert the direct current to an alternating current and to provide the alternating current to the air conditioner outdoor unit 3, so as to power up the air conditioner outdoor unit 3.

In this embodiment, the inverter 2 is further electrically connected to a power source from an electrical grid (e.g., the mains electricity), and is configured to provide electricity from the power source to the air conditioner outdoor unit 3 in cases that the alternating current converted from the direct current generated by the solar power panel 11 is insufficient for the air conditioner outdoor unit 3 to operate (e.g., due to the sunlight being blocked). In some embodiments, power from the power source and the alternating current may be fed to the air conditioner outdoor unit 3 in a parallel manner.

The storage device 5 contains a first liquid (e.g., a mixture of water, antifreeze and a phase-change material (PCM)) that is for performing heat exchange with the air conditioner outdoor unit 3 via a first conduit loop 9, in order to decrease a temperature of the first liquid. The first temperature sensor 51 is disposed in the storage device 5 for detecting the temperature of the first liquid in the storage device 5.

The fan 6 is capable of distributing conditioned air that exchanges heat with the storage device 5 via a second liquid (e.g., a circulating heat-conductive medium, such as water) through a second conduit loop 83 (the second conduit loop 83 consisting of one or more pipes, the pump 81 and the valve 82). In this embodiment, the fan 6 is incorporated within an air conditioner indoor unit included in the air conditioning system.

The pump 81 is used to drive the second liquid to flow in the second conduit loop 83. The valve 82 is operable to switch between an open state, in which the second liquid is able to flow in the second conduit loop 83, and a closed state, in which the second liquid is prohibited from flowing in the second conduit loop 83.

The control interface 7 is capable of communicating with the fan 6, the pump 81 and the valve 82. Specifically, the control interface 7 may be electrically connected to the fan 6, the pump 81 and the valve 82 using a number of electrical wires. The control interface 7 is further capable of receiving a signal from, for example, a remote control to switch an operation state of the fan 6 between an active state, in which the fan 6 operates (rotates), and an inactive state, in which the fan 6 does not operate. In some embodiments, the control interface 7 includes an operation panel, and is configured to switch the operation state of the fan 6 in response to user operation of the operation panel. In addition, the control interface 7 includes a temperature detector 71 for detecting a room temperature of the space in which the fan 6 is disposed.

When a signal indicating that the fan 6 is to be switched to the active state is received by the control interface 7, the control interface 7 controls the fan 6 to operate in the active state, controls the valve 82 to switch to the open state, and turns on the pump 81, thereby allowing the second liquid to flow within the second conduit loop 83.

The flow meter 43 is disposed in the path of the second conduit loop 83 for detecting a flow speed of the second liquid in the second conduit loop 83. The second and third temperature sensors 44 and 45 are disposed at different portions of the second conduit loop 83 for sensing temperatures of the second liquid in different stages. Specifically, in this embodiment, the second temperature sensor 44 is disposed to detect a first temperature of the second liquid at a first portion of the second conduit loop 83 where the second liquid is about to flow into the storage device 5, and the third temperature sensor 45 is disposed to detect a second temperature of the second liquid at a second portion of the second conduit loop 83 where the second liquid just flows out of the storage device 5.

The control mechanism 4 includes an energy controller 41 and an optical sensor 42.

The optical sensor 42 is configured to be disposed close to the solar power module 1, more particularly to the solar power panel 11, for detecting a luminance and a temperature of the sunlight received by the solar power panel 11 of the solar power module 1.

The energy controller 41 may be embodied using a physical device that includes circuitry, logic gates and a processing unit for executing various operations that will be described below. The energy controller 41 is electrically connected to the optical sensor 42, and is configured to be electrically connected to other components of the solar power module 1 and the air conditioner outdoor unit 3. Specifically, the energy controller 41 is electrically connected to a common node between the charge controller 12 and the inverter 2, a common node between the inverter 2 and the air conditioner outdoor unit 3, the flow meter 43, the first to third temperature sensors 51, 44 and 45, and the control interface 7.

For example, the energy controller 41 is electrically connected to the common node between the charge controller 12 and the inverter 2 and the common node between the inverter 2 and the air conditioner outdoor unit 3 via current clamp meters, respectively. Accordingly, the energy controller 41 is capable of obtaining an amount of the direct current outputted from the solar power panel 11 and an amount of the alternating current that is fed to the air conditioner outdoor unit 3 via the current clamp meters. It is noted that in some embodiments, the energy controller 41 may be electrically connected directly to the charge controller 12 and the inverter 2 to obtain the amount of the direct current and the amount of the alternating current.

By being electrically connected to the control interface 7, the energy controller 41 may be capable of obtaining information regarding the operation state of the fan 6 and the state of the valve 82 through the control interface 7.

Based on readings from the components electrically connected thereto, the energy controller 41 is programmed to control an operation state of the air conditioner outdoor unit 3 to switch between an active state, in which the air conditioner outdoor unit 3 operates, and an inactive state, in which the air conditioner outdoor unit 3 does not operate.

Specifically, in determining whether to control the air conditioner outdoor unit 3 to switch to the active state and the inactive state, a number of parameters are taken into consideration, including the luminance and the temperature of the sunlight detected by the optical sensor 42, the operation state of the fan 6, the current operation state of the air conditioner outdoor unit 3, the flow speed of the second liquid in the second conduit loop 83, the first temperature of the second liquid at the first portion of the second conduit loop 83, the second temperature of the second liquid at the second portion of the second conduit loop 83, and a relation among the temperature of the first liquid sensed by the first temperature sensor 51 and a first threshold temperature, a second threshold temperature and a third threshold temperature.

In this embodiment, the first to third threshold temperatures are selected in a manner that the first threshold temperature is larger than a phase transition temperature of the first liquid, the second threshold temperature is smaller than the phase transition temperature of the first liquid, and the third threshold temperature is smaller than the second threshold temperature. Specifically, phase transition refers to the melting/freezing of the first liquid. In one example, the phase transition temperature of the first liquid is 5° C., the first threshold temperature is 7° C., the second threshold temperature is 3° C., and the third threshold temperature is 1° C.

It is noted that an amount of heat that can be stored by a specific volume of the first liquid in different phases, even exactly during phase transition, may be radically different. For example, the first liquid in the solid phase with a temperature of 5° C. is capable of absorbing a significant amount of heat before melting and transitioning into liquid state at the same temperature of 5° C.

Figure 2:
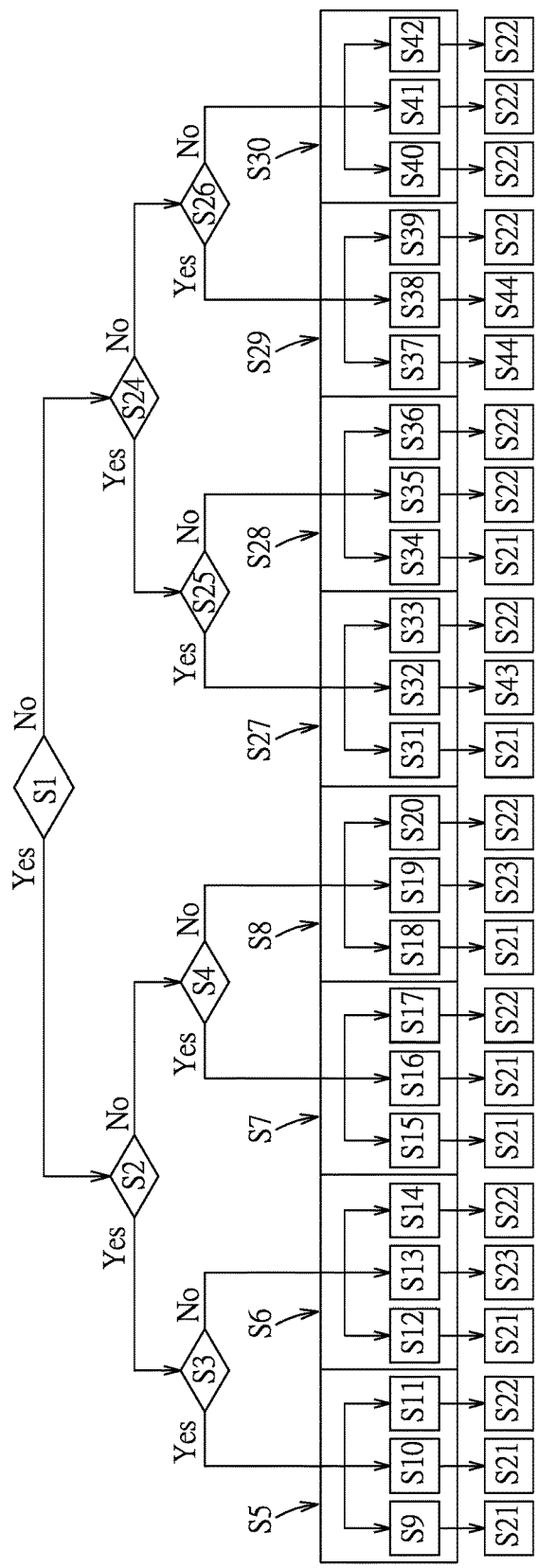
FIGS. 2 to 7 are flow charts illustrating steps of a method implemented by the control mechanism for controlling the air conditioning system according to one embodiment of the disclosure.

FIG. 2 is a flow chart illustrating steps of a method for controlling the air conditioning system, implemented by the control mechanism 4 according to one embodiment of this disclosure.

In step S1, the energy controller 41 determines whether the sunlight, to which the solar power panel 11 is exposed, is sufficient for the solar power panel 11 to generate the direct current large enough (for conversion into the alternating current) to drive the operation of the air conditioner outdoor unit 3.

Such a determination may be implemented by obtaining the luminance and the temperature of the sunlight detected by the optical sensor 42, applying the luminance and the temperature to a predetermined equation (relative to a power consumption of the solar power module 1 and the air conditioner outdoor unit 3) so as to calculate a sunlight-related value indicating intensity of the sunlight, and comparing the sunlight-related value to a predetermined sunlight threshold. When the sunlight-related value is larger than the predetermined sunlight threshold, the energy controller 41 determines that the sunlight is sufficient. It is noted that, the energy controller 41 may obtain data regarding the luminance and the temperature over a specific time duration (e.g., 10 minutes), calculate average values respectively of the luminance and the temperature during the time duration, and apply the average values to the predetermined equation. In this manner, potential inaccuracies due to the sunlight being temporarily blocked by clouds may be reduced.

When the determination in step S1 is affirmative, the flow proceeds to step S2. Otherwise, the flow proceeds to step S24.

In step S2, the energy controller 41 determines whether the fan 6 is in the active state or the inactive state. When it is determined that the fan 6 is in the active state, the flow proceeds to step S3. Otherwise, the flow proceeds to step S4.

In step S3, the energy controller 41 determines whether the air conditioner outdoor unit 3 is in the active state or the inactive state. When it is determined that the air conditioner outdoor unit 3 is in the active state, the flow proceeds to step S5. Otherwise, the flow proceeds to step S6.

Similarly, in step S4, the energy controller 41 determines whether air conditioner outdoor unit 3 is in the active state or the inactive state. When it is determined that the air conditioner outdoor unit 3 is in the active state, the flow proceeds to step S7. Otherwise, the flow proceeds to step S8.

In step S5, the energy controller 41 determines the relation among the temperature of the first liquid and the first to third threshold temperatures. Given that the sunlight is sufficient, the fan 6 is in the active state, and the air conditioner outdoor unit 3 is in the active state, a number of different operations may be carried out based on a result of the determination made in step S5.

Specifically, step S5 includes steps S9-S11. When it is determined that the temperature of the first liquid is higher than the first threshold temperature (e.g., higher than 7° C.) in step S9, the energy controller 41 controls the air conditioner outdoor unit 3 to operate in the active state in step S21, and performs subsequent steps S211 to S219 (see FIG. 3).

Figure 3:
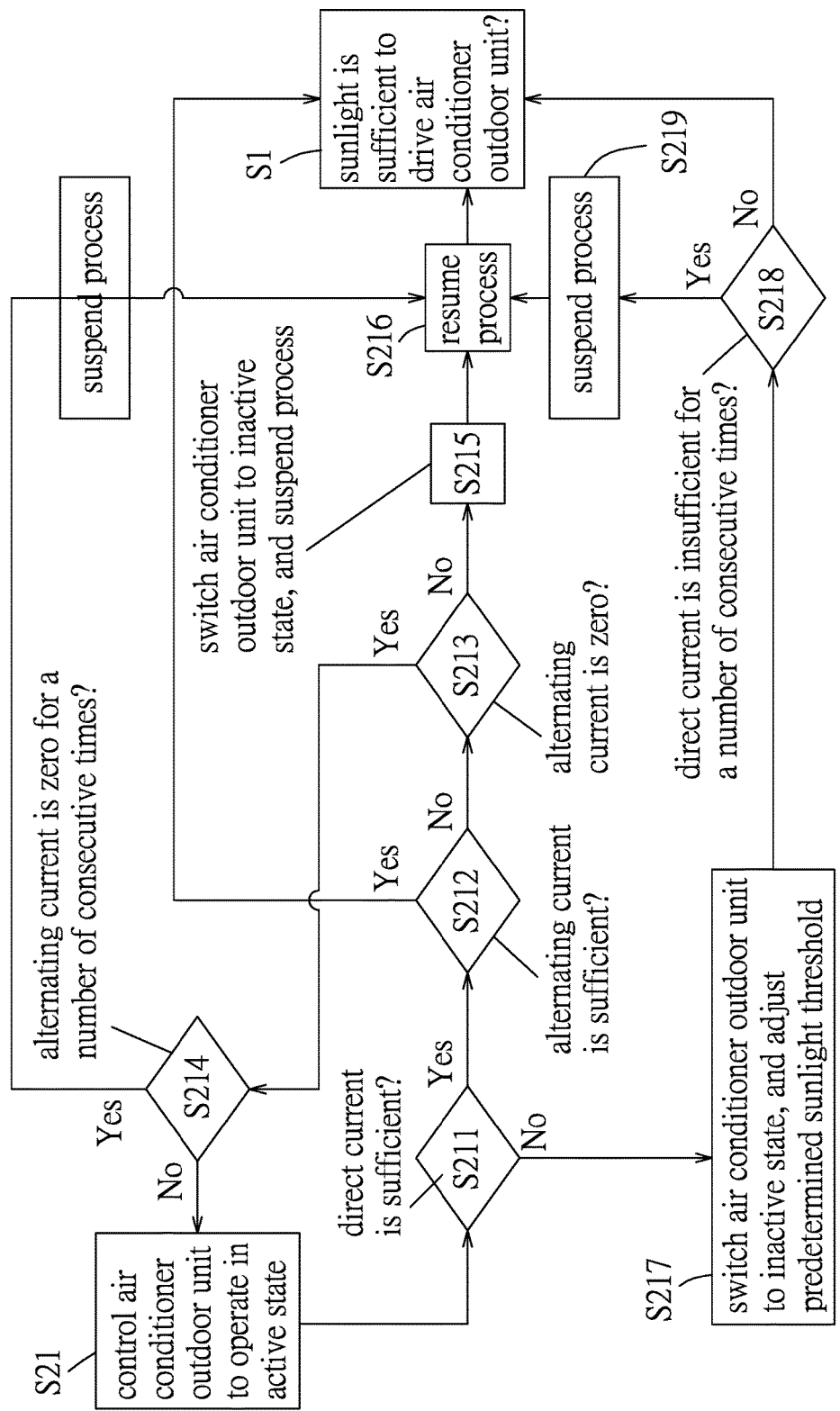

When it is determined that the temperature of the first liquid is between the third threshold temperature and the first threshold temperature (e.g., between 1° C. and 7° C.) in step S10, the energy controller 41 also performs step S21 and subsequent steps S211 to S219 (see FIG. 3).

Figure 4:
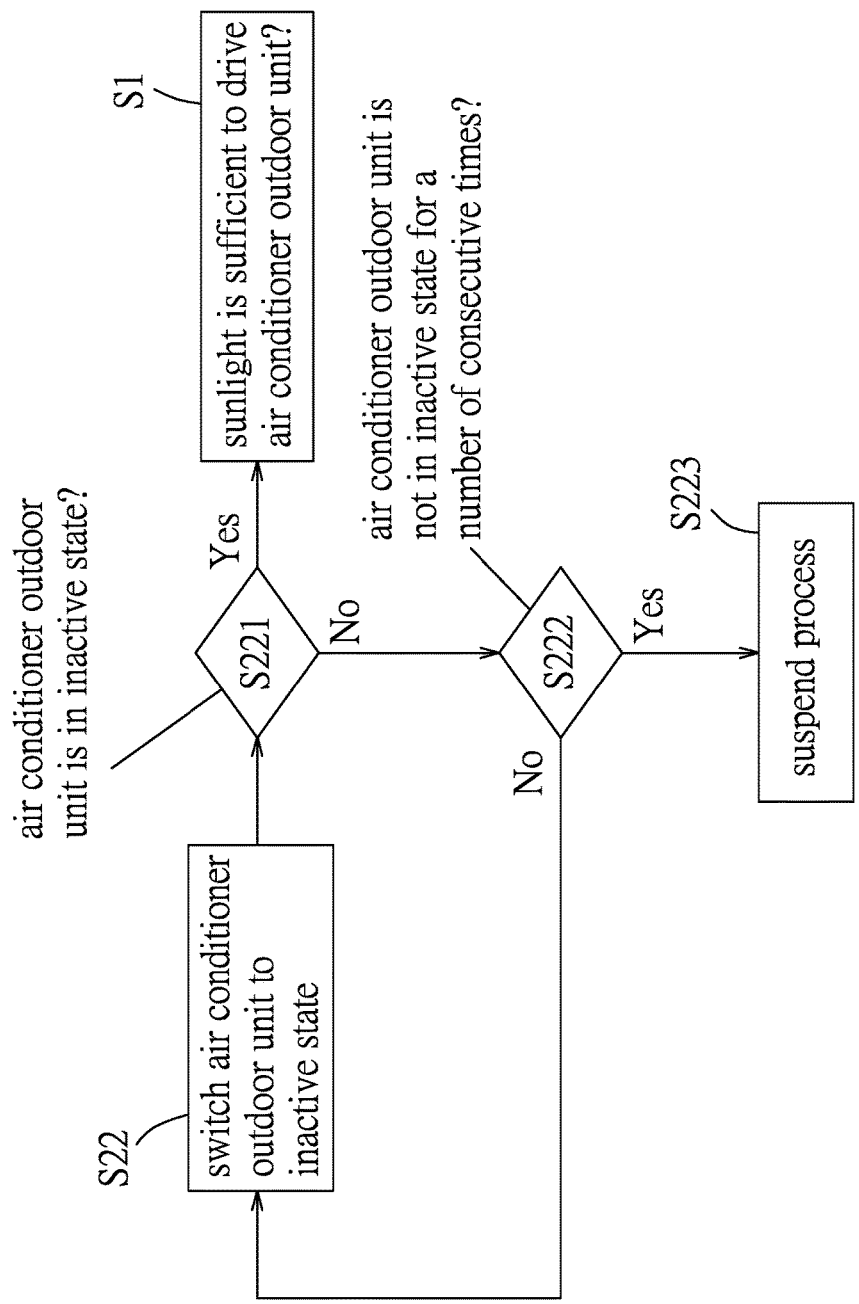

When it is determined that the temperature of the first liquid is lower than the third threshold temperature (e.g., lower than 1° C.) in step S11, the energy controller 41 performs step S22 to switch the air conditioner outdoor unit 3 to the inactive state and subsequent steps S221 to S223 (see FIG. 4).

In step S6, which is similar to step S5, and in which the energy controller 41 determines the relation among the temperature of the first liquid and the first to third threshold temperatures. Given that the sunlight is sufficient, the fan 6 is in the active state, and the air conditioner outdoor unit 3 is in the inactive state, a number of different operations may be carried out based on a result of the determination made in step S6.

Specifically, step S6 includes steps S12-S14. When it is determined that the temperature of the first liquid is higher than the first threshold temperature in step S12, the flow proceeds to step S21 and subsequent steps S211 to S219.

Figure 5:
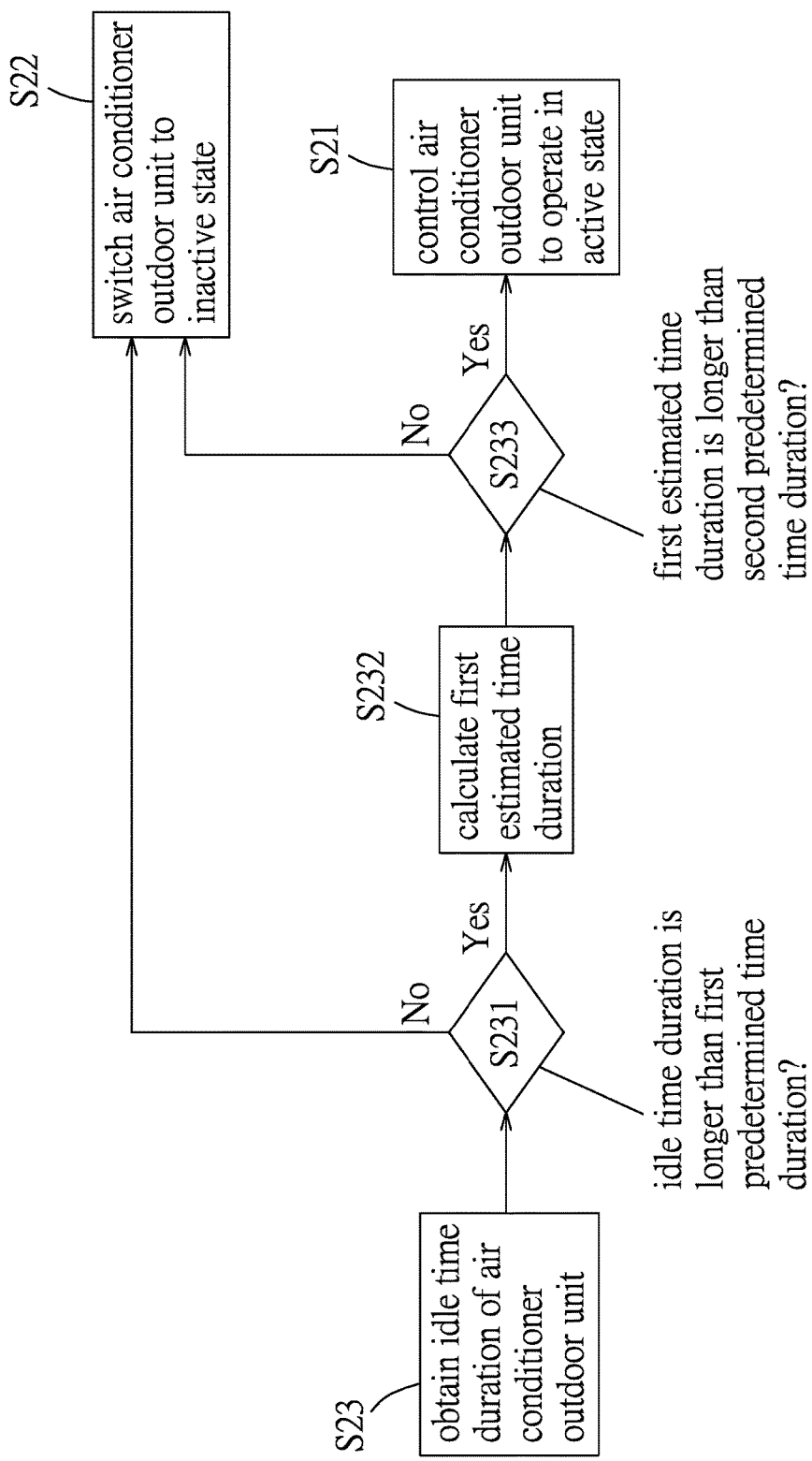

When it is determined that the temperature of the first liquid is between the second threshold temperature and the first threshold temperature (e.g., between 3° C. and 7° C.) in step S13, the energy controller 41 performs step S23 to obtain an idle time duration for which the air conditioner outdoor unit 3 remains in the inactive state and further performs subsequent steps S231 to S233 (see FIG. 5).

When it is determined that the temperature of the first liquid is lower than the second threshold temperature (e.g., lower than 3° C.) in step S14, the flow proceeds to step S22 and subsequent steps S221 to S223.

In step S7, which is similar to step S5, and in which the energy controller 41 determines the relation among the temperature of the first liquid and the first to third threshold temperatures. Given that the sunlight is sufficient, the fan 6 is in the inactive state, and the air conditioner outdoor unit 3 is in the active state, a number of different operations may be carried out based on a result of the determination made in step S7.

Specifically, step S7 includes steps S15-S17. When it is determined that the temperature of the first liquid is higher than the first threshold temperature in step S15, the flow proceeds to step S21 and subsequent steps S211 to S219.

When it is determined that the temperature of the first liquid is between the third threshold temperature and the first threshold temperature (e.g., between 1° C. and 7° C.) in step S16, the flow similarly proceeds to step S21 and subsequent steps S211 to S219.

When it is determined that the temperature of the first liquid is lower than the third threshold temperature in step S17, the flow proceeds to step S22 and subsequent steps S221 to S223.

In step S8, which is similar to step S5, and in which the energy controller 41 determines the relation among the temperature of the first liquid and the first to third threshold temperatures. Given that the sunlight is sufficient, the fan 6 is in the inactive state, and the air conditioner outdoor unit 3 is in the inactive state, a number of different operations may be carried out based on a result of the determination made in step S8.

Specifically, step S8 includes steps S18-S20. When it is determined that the temperature of the first liquid is higher than the first threshold temperature in step S18, the flow proceeds to step S21 and subsequent steps S211 to S219.

When it is determined that the temperature of the first liquid is between the second threshold temperature and the first threshold temperature in step S19, the flow proceeds to step S23 and subsequent steps S231 to S233 (see FIG. 5).

When it is determined that the temperature of the first liquid is lower than the second threshold temperature in step S20, the flow proceeds to step S22 and subsequent steps S221 to S223.

The specific operations of steps S21 to S23 will now be described in the following paragraphs with reference to FIGS. 3-5.

FIG. 3 is a flow chart illustrating steps S211 to S219 performed by the energy controller 41 subsequent to step S21.

After step S21, in which the energy controller 41 controls the air conditioner outdoor unit 3 to remain in the active state, in step S211, the energy controller 41 determines whether the direct current relayed by the charge controller 12 is sufficient. This may be done by, for example, comparing the direct current with a first predetermined threshold.

When it is determined that direct current relayed by the charge controller 12 is sufficient (that is to say, a power outputted by the solar power panel 11 is sufficient for enabling the operation of the air conditioner outdoor unit 3), the flow proceeds to step S212. Otherwise, the flow proceeds to step S217.

It is noted that in the embodiments where the inverter 2 is electrically connected to the power source (e.g., the mains electricity), the power source may provide a part of the power required by the air conditioner outdoor unit 3 (e.g., 20%), and thus, it may not be required for the solar power panel 11 to provide all of the power required by the air conditioner outdoor unit 3. In such case, the energy controller 41 may determine that the direct current relayed by the charge controller 12 is sufficient when the direct current is sufficient to provide, for example, 80% of the power required by the air conditioner outdoor unit 3.

In step S212, the energy controller 41 determines whether the alternating current is sufficient (that is to say, the alternating current is enough for enabling operation of the air conditioner outdoor unit 3). This is may be done by, for example, comparing the alternating current with a second predetermined threshold.

When it is determined by the energy controller 41 that the alternating current outputted by the inverter 2 is sufficient, the energy controller 41 may determine that the operation of the air conditioner outdoor unit 3 is normal, and the flow goes back to step S1, and the method may be repeated immediately.

When it is determined by the energy controller 41 that the alternating current outputted by the inverter 2 is insufficient in step S212, the energy controller 41 further determines whether the alternating current is zero in step S213. When it is determined by the energy controller 41 that the alternating current is non-zero, the flow proceeds to step S215. Otherwise, the flow proceeds to step S214.

In step S214, the energy controller 41 determines whether the determination that the alternating current is zero has been made for a number of consecutive times (e.g., three times). When the determination made in step S214 is affirmative, the flow proceeds to step S216. Otherwise, the flow goes back to step S21 in an attempt to activate the air conditioner outdoor unit 3.

In step S215, the energy controller 41 switches the air conditioner outdoor unit 3 to the inactive state, and temporarily suspends the process of the method for controlling the air conditioner outdoor unit 3. Additionally, the energy controller 41 may generate an alert message indicating that the air conditioner outdoor unit 3 cannot obtain enough power for operation (i.e., electric power provided to the solar power module 1 is abnormal), and a troubleshooting process may be applied to the inverter 2 and/or the battery 13 in order to restore the electric power. The alert message may be displayed using a display (not depicted in the drawings) coupled to the energy controller 41.

After the troubleshooting process is completed, a resume signal may be transmitted to the energy controller 41, instructing the energy controller 41 to resume the process for controlling the air conditioner outdoor unit 3. This may be done by the user pressing a button included in the energy controller 41.

In response to the resume signal, the flow proceeds to step S216, in which the energy controller 41 resumes the process for controlling the air conditioner outdoor unit 3, and the flow goes back to step S1.

In step S217, the energy controller 41 switches the air conditioner outdoor unit 3 from the active state to the inactive state, and adjusts the predetermined sunlight threshold. In one example, the predetermined sunlight threshold is adjusted to be larger, indicating that the sunlight received by the solar power panel 11 needs to be more intense in order to surpass the adjusted predetermined sunlight threshold.

In step S218, the energy controller 41 determines whether the determination made in step S211 that the direct current relayed by the charge controller 12 is insufficient has been made for a number of consecutive times (e.g., three times). When the determination is negative, the flow goes back to step S1. Otherwise, the flow proceeds to step S219, in which the energy controller 41 suspends the process of the method, generates an alert message indicating that the direct current is insufficient for supporting operation of the air conditioner outdoor unit 3, and a troubleshooting process may be applied to the solar power panel 11 and/or the charge controller 12. Afterward, in response to the resume signal, the flow proceeds to step S216, in which the energy controller 41 resumes the process for controlling the air conditioner outdoor unit 3, and the flow goes back to step S1.

FIG. 4 is a flow chart illustrating steps S221 to S223 performed by the energy controller 41 subsequent to step S22.

After step S22, in which the energy controller 41 switches the air conditioner outdoor unit 3 to the inactive state, the energy controller 41 determines, in step S221, whether the air conditioner outdoor unit 3 is in the inactive state. This may be done by determining whether the alternating current equals zero.

When it is determined by the energy controller 41 in step S221 that the air conditioner outdoor unit 3 is in the inactive state, the flow goes back to step S1. Otherwise, the flow proceeds to step S222, in which the energy controller 41 determines whether the determination made in step S221 that the air conditioner outdoor unit 3 is not in the inactive state has been made for a number of consecutive times (e.g., three times). When the determination made in step S222 is negative, the flow goes back to step S22. Otherwise, the flow proceeds to step S223, in which the energy controller 41 generates an alert message indicating that the air conditioning system has malfunctioned, and the process of the method is suspended.

FIG. 5 is a flow chart illustrating steps S231 to S233 performed by the energy controller 41 subsequent to step S23.

After step S23, in which the energy controller 41 obtains an idle time duration for which the air conditioner outdoor unit 3 remains in the inactive state, the energy controller 41 compares, in step S231, the idle time duration with a first predetermined time duration (e.g., 30 minutes or one hour). When it is determined that the idle time duration is longer than the first predetermined time duration, the flow proceeds to step S232. Otherwise, the flow goes to step S22.

In step S232, the energy controller 41 calculates a first estimated time duration, for which the first liquid in the storage device 5 is still able to store/absorb heat for decreasing the temperature of the first liquid while the air conditioner outdoor unit 3 is in the active state.

In operation, a result of a heat exchange between the first liquid and the air conditioner outdoor unit 3 is the heat leaving the space in which the fan 6 is disposed via the air conditioner outdoor unit 3 and the temperature of the first liquid being lowered. In this manner, the storage device 5 is said to be able to store more heat from heat exchange with the fan 6, which draws heat from the space to the storage device 5 and increases the temperature of the first liquid.

The calculation in step S232 includes the energy controller 41 first calculating an amount of heat expended by the first liquid. The calculation is based on the flow speed of the second liquid in the second conduit loop 83, and the first temperature of the second liquid and the second temperature of the second liquid that are respectively detected by the second and third temperature sensors 44 and 45 the last time the air conditioner outdoor unit 3 operates in the active state. Afterward, the energy controller 41 calculates the first estimated time duration, based on the amount of heat expended by the first liquid and the temperature of the first liquid in the storage device 5.

In step S233, the energy controller 41 compares the first estimated time duration with a second predetermined time duration (e.g., 30 minutes or one hour). When it is determined by the energy controller 41 that the first estimated time duration is longer than the second predetermined time duration, the flow proceeds to step S21. Otherwise, the flow goes to step S22.

Referring back to FIG. 2, when it is determined in step S1 that the sunlight is insufficient, the flow proceeds to step S24.

The operations of steps S24 to S30 are similar to those of step S2 to S8, respectively. That is to say, in step S24, the energy controller 41 determines whether the fan 6 is in the active state or the inactive state. When it is determined that the fan 6 is in the active state, the flow proceeds to step S25. Otherwise, the flow proceeds to step S26.

In step S25, the energy controller 41 determines whether the air conditioner outdoor unit 3 is in the active state or the inactive state. When it is determined that the air conditioner outdoor unit 3 is in the active state, the flow proceeds to step S27. Otherwise, the flow proceeds to step S28.

Similarly, in step S26, the energy controller 41 determines whether the air conditioner outdoor unit 3 is in the active state or the inactive state. When it is determined that the air conditioner outdoor unit 3 is in the active state, the flow proceeds to step S29. Otherwise, the flow proceeds to step S30.

In step S27, the energy controller 41 determines the relation among the temperature of the first liquid and the first to third threshold temperatures.

Given that the sunlight is insufficient, the fan 6 is in the active state, and the air conditioner outdoor unit 3 is in the active state, a number of different operations may be carries out based on a result of the determination made in step S27.

Specifically, step S27 includes steps S31-S33. When it is determined that the temperature of the first liquid is higher than the first threshold temperature (e.g., higher than 7° C.) in step S31, the flow goes to step S21.

Figure 6:
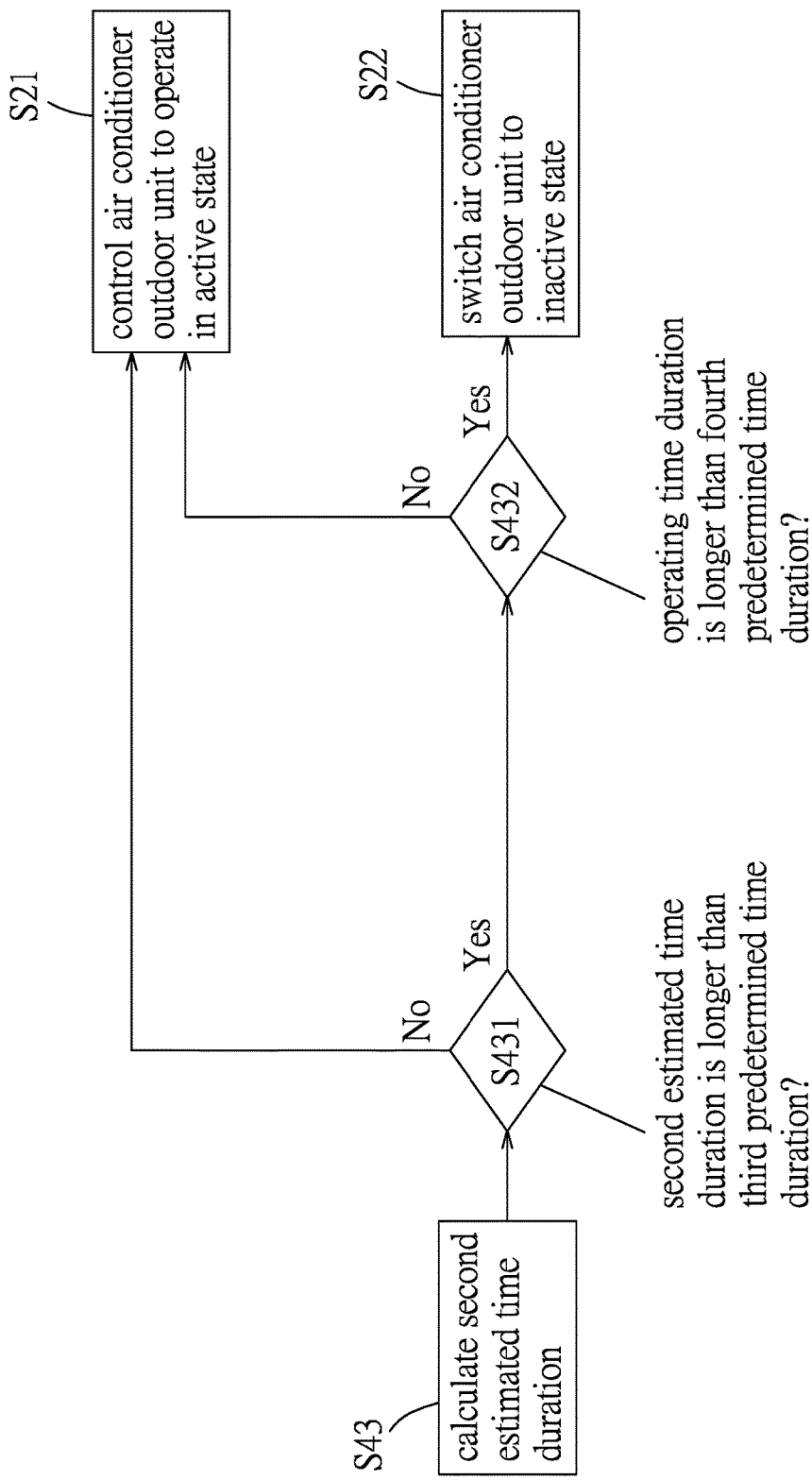

When it is determined that the temperature of the first liquid is between the second threshold temperature and the first threshold temperature (e.g., between 3° C. and 7° C.) in step S32, the flow proceeds to step S43 (see FIG. 6).

When it is determined that the temperature of the first liquid is lower than the second threshold temperature (e.g., lower than 3° C.) in step S33, the flow goes to step S22.

Given that the sunlight is sufficient, the fan 6 is in the active state, and the air conditioner outdoor unit 3 is in the inactive state, a number of different operations may be carried out based on a result of the determination made in step S28.

Specifically, step S28 includes steps S34-S36. When it is determined that the temperature of the first liquid is higher than the first threshold temperature in step S34, the flow goes to step S21.

When it is determined that the temperature of the first liquid is between the second threshold temperature and the first threshold temperature in step S35, the flow goes to step S22.

When it is determined that the temperature of the first liquid is lower than the second threshold temperature in step S36, the flow goes to step S22.

Given that the sunlight is insufficient, the fan 6 is in the inactive state, and the air conditioner outdoor unit 3 is in the active state, a number of different operations may be carried out based on a result of the determination made in step S29.

Specifically, step S29 includes steps S37-S39. When it is determined that the temperature of the first liquid is higher than the first threshold temperature in step S37, the flow proceeds to step S44 and subsequent step S441 (see FIG. 7).

When it is determined that the temperature of the first liquid is between the second threshold temperature and the first threshold temperature in step S38, the flow also proceeds to step S44.

When it is determined that the temperature of the first liquid is lower than the second threshold temperature in step S39, the flow proceeds to step S22.

Given that the sunlight is insufficient, the fan 6 is in the inactive state, and the air conditioner outdoor unit 3 is in the inactive state, the flow goes to step S22 regardless of the relation among the temperature of the first liquid and the first to third threshold temperatures. In other words, the flow proceeds to step S22 after execution of step S30.

FIG. 6 is a flow chart illustrating step S43 and subsequent steps S431 and S432 performed by the energy controller 41.

In step S43, the energy controller 41 calculates a second estimated time duration in which the storage device 5 is able to absorb heat in order to decrease the temperature of air blown by the fan 6 while the fan 6 is in the active state. The calculation is based on an amount of heat expended in the storage device 5 and the temperature sensed by the first temperature sensor 51.

Specifically, the amount of heat expended while the air conditioner outdoor unit 3 is in the active state is calculated based on the flow speed of the second liquid in the second conduit loop 83, the first temperature of the second liquid at the first portion of the second conduit loop 83, and the second temperature of the second liquid at the second portion of the second conduit loop 83.

In step S431, the energy controller 41 compares the second estimated time duration with a third predetermined time duration (for example, 30 to 60 minutes). When it is determined that the second estimated time duration is longer than the third predetermined time duration, the flow proceeds to step S432. Otherwise, the flow goes to step S21.

In step S432, the energy controller 41 obtains an operating time duration in which the air conditioner outdoor unit 3 remains in the active state, and compares the operating time duration with a fourth predetermined time duration (e.g., one hour). When it is determined that the operating time duration is longer than the fourth predetermined time duration, the flow goes to step S22. Otherwise, the flow goes to step S21. For example, the energy controller 41 may obtain the operating time duration by a timer.

Figure 7:
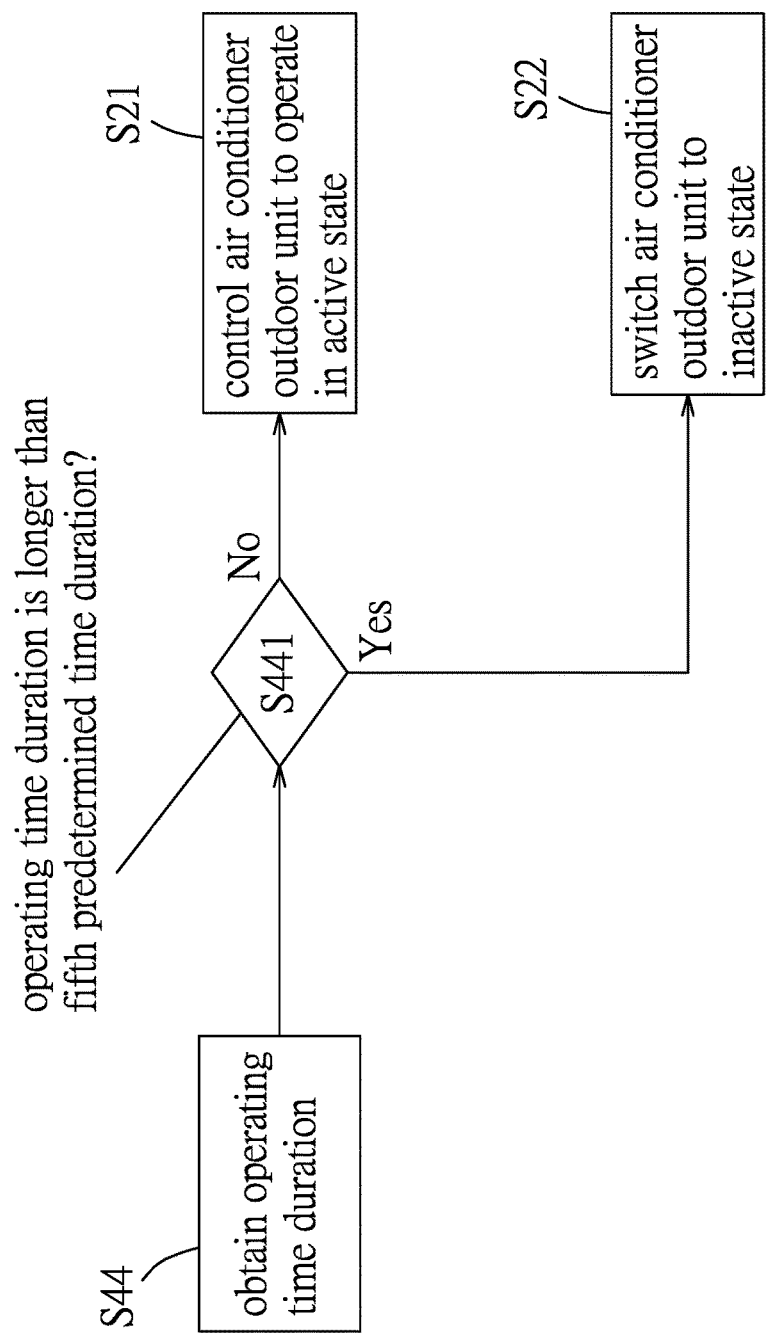

FIG. 7 is a flow chart illustrating step S44 and subsequent step S441 performed by the energy controller 41.

In step S44, the energy controller 41 obtains the operating time duration in which the air conditioner outdoor unit 3 remains in the active state. Then, in step S441, the energy controller 41 compares the operating time duration with a fifth predetermined time duration (e.g., 30 minutes or one hour). When it is determined that the operating time duration is longer than the fifth predetermined time duration, the flow goes to step S22. Otherwise, the flow goes to step S21.

Based on the operations as described in the above paragraphs and depicted in FIGS. 2 to 7, a number of general rules, referring to which the air conditioner outdoor unit 3 is to be controlled, may be induced as described in the succeeding paragraphs.

Specifically, in a first rule, based on steps S1 to S4, S5, S7, S9 to S11, S15 to S17, S21 and S22, it may be induced that under the circumstance that: a) the energy controller 41 determines the sunlight to be sufficient according to the luminance and the temperature of the sunlight detected by the optical sensor 42; b) the air conditioner outdoor unit 3 is in the active state; and c) the temperature sensed by the first temperature sensor 51 is larger than the third threshold temperature, the energy controller 41 controls the air conditioner outdoor unit 3 to remain in the active state. Once the temperature sensed by the first temperature sensor 51 becomes smaller than the third threshold temperature, the energy controller 41 switches the air conditioner outdoor unit 3 to the inactive state.

In a second rule, based on steps S1 to S4, S6, S8, S12, S18 and S21, it may be induced that under the circumstance that: a) the energy controller 41 determines the sunlight to be sufficient; b) the air conditioner outdoor unit 3 is in the inactive state; and c) the temperature sensed by the first temperature sensor 51 is larger than the first threshold temperature, the energy controller 41 switches the air conditioner outdoor unit 3 to the active state and controls the air conditioner outdoor unit 3 to remain in the active state. Once the temperature sensed by the temperature sensor 51 becomes smaller than the third threshold temperature, the energy controller 41 switches the air conditioner outdoor unit 3 to the inactive state.

In a third rule, based on steps S1 to S4, S6, S8, S13, S19 and S23, it may be induced that under the circumstance that: a) the energy controller 41 determines that the sunlight is sufficient; b) the air conditioner outdoor unit 3 is in the inactive state; and c) the temperature sensed by the first temperature sensor 51 is between the first threshold temperature and the second threshold temperature, the energy controller 41 is programmed to obtain the idle time duration, calculate the amount of heat expended by the first liquid, and calculate the first estimated time duration. Afterward, the energy controller 41 switches the air conditioner outdoor unit 3 to the active state when the idle time duration is longer than the first predetermined time duration, and the first estimated time duration is longer than the second predetermined time duration; the energy controller 41 controls the air conditioner outdoor unit 3 to remain in the inactive state when the idle time duration is shorter than the first predetermined time duration, or when the first estimated time duration is shorter than the second predetermined time duration.

In a fourth rule, based on steps S1 to S4, S6, S8, S14, S20 and S22, it may be induced that under the circumstance that: a) the energy controller 41 determines that the sunlight is sufficient; b) the air conditioner outdoor unit 3 is in the inactive state; and c) the temperature of the first liquid in the storage device 5 sensed by the first temperature sensor 51 is smaller than the second threshold temperature, the energy controller 41 controls the air conditioner outdoor unit 3 to remain in the inactive state.

In a fifth rule, based on steps S1, S21, S24, S25, S27, S28, S31 and S34, it may be induced that under the circumstance that: a) the energy controller 41 determines that the sunlight is insufficient according to the luminance and the temperature of the sunlight detected by the optical sensor 42; b) the fan 6 is in the active state; and c) the temperature of the first liquid in the storage device 5 sensed by the first temperature sensor 51 is larger than the first threshold temperature, the energy controller 41 controls the air conditioner outdoor unit 3 to operate in the active state.

In a sixth rule, based on steps S1, S24, S25, S27, S32 and S43, it may be induced that under the circumstance that: a) the energy controller 41 determines that the sunlight is insufficient; b) the fan 6 is in the active state; c) the air conditioner outdoor unit 3 is in the active state; and d) the temperature of the first liquid in the storage device 5 is between the first threshold temperature and the second threshold temperature, the energy controller 41 is programmed to obtain the operating time duration, and to calculate the second estimated time duration. Afterward, the energy controller 41 switches the air conditioner outdoor unit 3 to the inactive state when the second estimated time duration is longer than the third predetermined time duration, and when the operating time duration is longer than the fourth predetermined time duration. In addition, the energy controller 41 controls the air conditioner outdoor unit 3 to remain in the active state when the second estimated time duration is shorter than the third predetermined time duration, or when the operating time duration is shorter than the fourth predetermined time duration.

In a seventh rule, based on steps S1, S22, S24, S25, S28 and S35, it may be induced that under the circumstance that: a) the energy controller 41 determines that the sunlight is insufficient; b) the fan 6 is in the active state; c) the air conditioner outdoor unit 3 is in the inactive state; and d) the temperature of the first liquid in the storage device 5 is between the first threshold temperature and the second threshold temperature, the energy controller 41 controls the air conditioner outdoor unit 3 to remain in the inactive state.

In an eighth rule, based on steps S1, S22, S24 to S30, S33, S36 and S39, it may be induced that under the circumstance that: a) the energy controller 41 determines that the sunlight is insufficient; and b) the temperature of the first liquid in the storage device 5 is smaller than the second threshold temperature, the energy controller 41 switches the air conditioner outdoor unit 3 to the inactive state.

In a ninth rule, based on steps S1, S24, S26, S29, S37, S38 and S44, it may be induced that under the circumstance that: a) the energy controller 41 determines that the sunlight is insufficient; b) the fan 6 is in the inactive state; c) the air conditioner outdoor unit 3 is in the active state; and d) the air temperature of the first liquid in the storage device 5 is larger than the second threshold temperature, the energy controller 41 is programmed to obtain the operating time duration, and control the air conditioner outdoor unit 3 to remain in the active state when the operating time duration is shorter than the fifth predetermined operating duration. In addition, the energy controller 41 switches the air conditioner outdoor unit 3 to the inactive state when the operating time duration becomes longer than the fifth predetermined time duration.

In a tenth rule, based on steps S1, S22, S24, S26 and S30, it may be induced that under the circumstance that: a) the energy controller 41 determines that the sunlight is insufficient; b) the fan 6 is in the inactive state; c) the air conditioner outdoor unit 3 is in the inactive state; and d) the temperature of the first liquid in the storage device 5 sensed by the temperature sensor 51 is larger than the second threshold temperature, the energy controller 41 is programmed to control the air conditioner outdoor unit 3 to remain in the inactive state.

Figure 8:
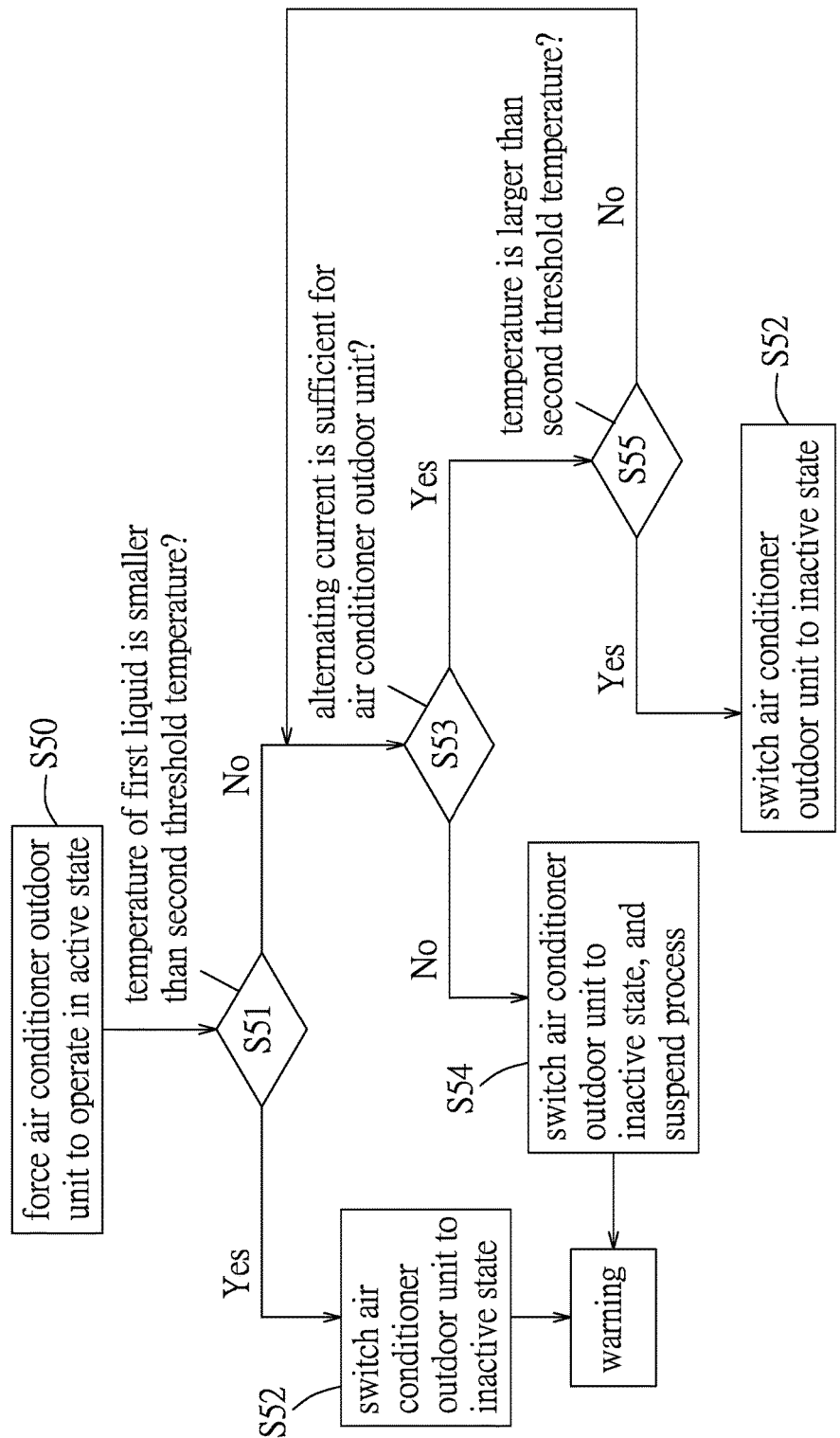
FIG. 8 is a flow chart illustrating steps of a part of a method implemented by the control mechanism for controlling the air conditioning system according to an alternative embodiment of the disclosure.

FIG. 8 is a flow chart illustrating steps of a method for controlling the air conditioning system, according to another embodiment of the disclosure.

In step S50, in response to receipt of an activate signal from the control interface 7, the energy controller 41 forces the air conditioner outdoor unit 3 to operate in the active state. The activate signal may be generated by the control interface 7 in response to a user pressing a power-on button on the control interface 7, and transmitted to the energy controller 41.

In step S51, the energy controller 41 compares the temperature of the first liquid in the storage device 5 sensed by the first temperature sensor 51 and the second threshold temperature. When it is determined that the temperature of the first liquid in the storage device 5 sensed by the first temperature sensor 51 is smaller than the second threshold temperature, the flow proceeds to step S52, in which the energy controller 41 switches the air conditioner outdoor unit 3 to the inactive state, and generates an alert message indicating that the storage device 5 currently stores an abundant amount of energy. Otherwise, the flow proceeds to step S53.

In step S53, the energy controller 41 determines whether the alternating current is sufficient for the operation of the air conditioner outdoor unit 3, for example, in a manner similar to that of step S212. When it is determined that the alternating current is sufficient for the air conditioner outdoor unit 3, the flow proceeds to step S55. Otherwise, the flow proceeds to step S54, in which a number of actions similar to those of step S215 are performed. Specifically, in step S54, the energy controller 41 switches the air conditioner outdoor unit 3 to the inactive state, and temporarily suspends the process of the method. Additionally, the energy controller 41 may generate the alert message indicating that the air conditioner outdoor unit 3 cannot obtain enough power for operation, and a troubleshooting process may be applied to the inverter 2 and/or the battery 13 in order to restore the power.

In step S55, the energy controller 41 determines whether the temperature sensed by the first temperature sensor 51 is larger than the second threshold temperature. When it is determined by the energy controller 41 that the temperature sensed by the first temperature sensor 51 is larger than the second threshold temperature, the flow goes to step S52. Otherwise, the flow goes to step S53.

It can be induced that, based on the operations depicted in FIG. 8, in response to receipt of the activate signal from the control interface 7, the energy controller 41 forces the air conditioner outdoor unit 3 to operate in the active state. Afterward, when it is determined that the temperature of the first liquid in the storage device 5 sensed by the first temperature sensor 51 is smaller than the second threshold temperature, the energy controller 41 switches the air conditioner outdoor unit 3 to the inactive state.

Figure 9:
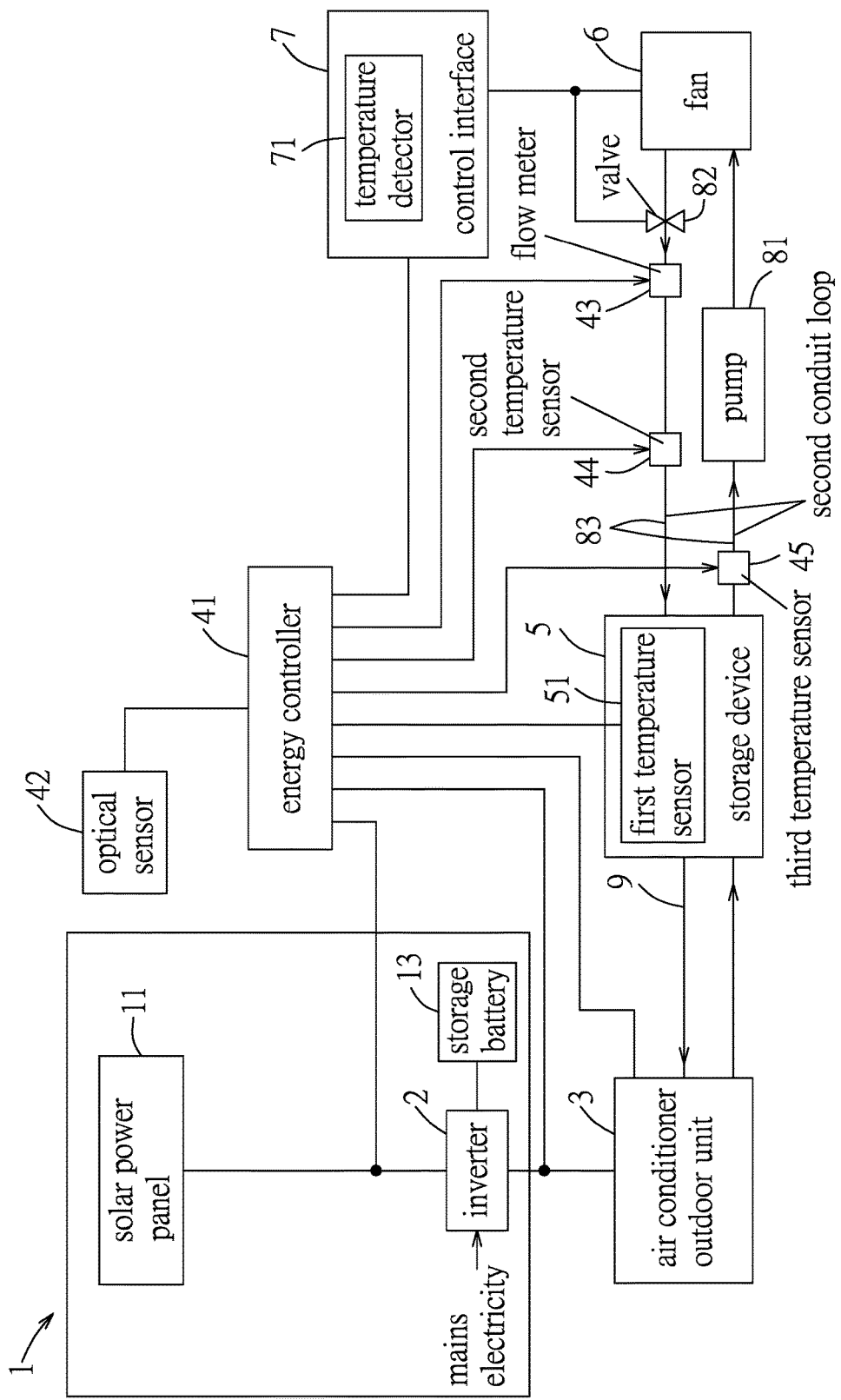
FIG. 9 is a block diagram illustrating the control mechanism with an air conditioning system that includes an on-grid system according to one embodiment of the disclosure.

It is noted that, the solar power module 1 as described in above embodiments may be implemented using a hybrid system. FIG. 9 is a block diagram illustrating a solar power module 1' that is embodied using an on-grid system according to one embodiment of the disclosure. The solar power module 1' as depicted in this embodiment does not include the charge controller 12 and the battery 13 included in the air conditioning system of FIG. 1, and the direct current generated by the solar power panel 11 is transmitted directly to the inverter 2.

Figure 10:
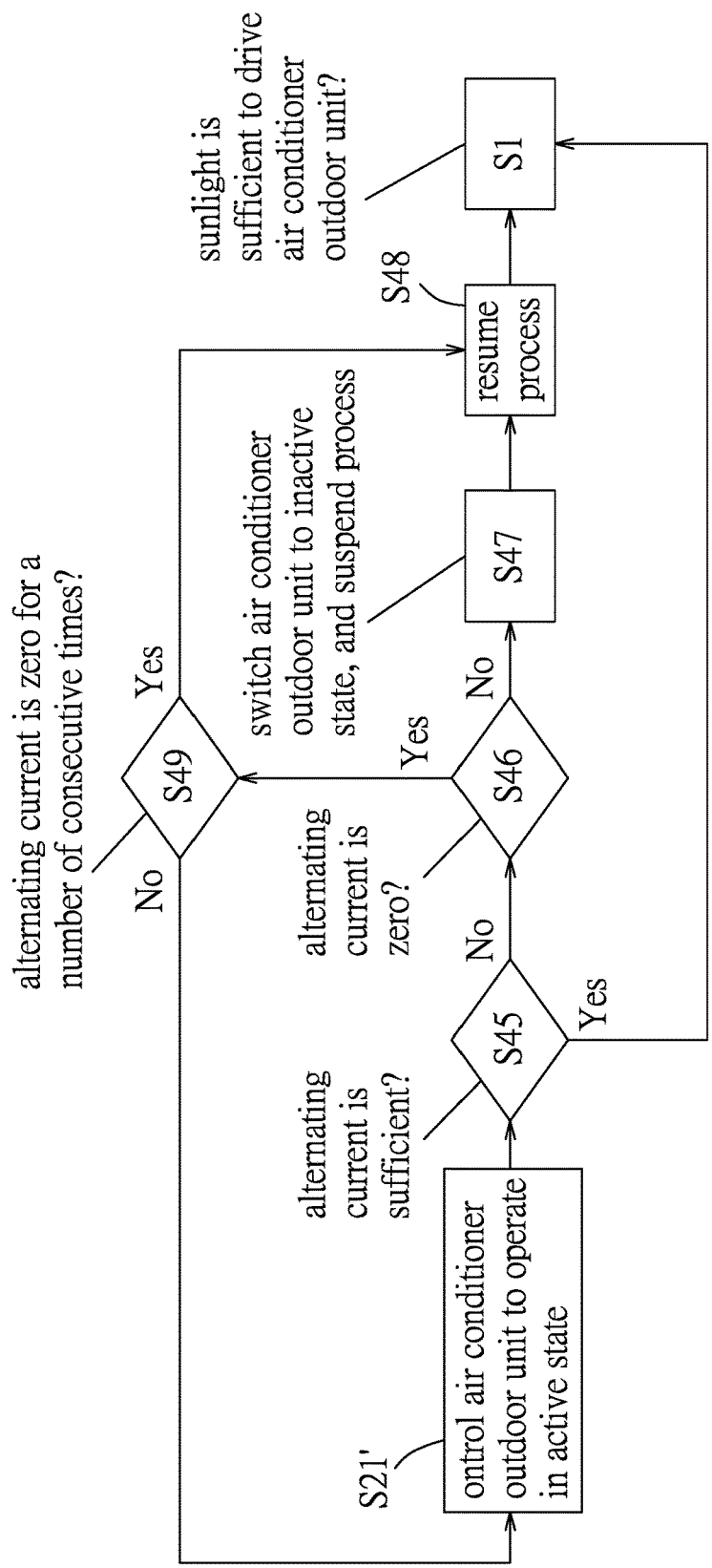
FIG. 10 is a flowchart illustrating steps of a part of a method for controlling the air conditioning system of FIG. 9.

FIG. 10 is a flowchart illustrating some steps of the method for controlling the air conditioning system of FIG. 9, according to one embodiment of the disclosure. Specifically, FIG. 10 illustrates step S21' that corresponds with step S21 of the method as depicted in FIG. 3 and steps subsequent to step S21'.

In step S21', the energy controller 41 controls the air conditioner outdoor unit 3 to operate in the active state. Afterward, in step S45, the energy controller 41 determines whether the alternating current is sufficient. This is may be done by, for example, comparing the alternating current with the second predetermined threshold.

When it is determined by the energy controller 41 that the alternating current outputted by the inverter 2 is sufficient, the energy controller 41 may determine that the operation of the air conditioner outdoor unit 3 is normal, and the flow goes back to step S1 to repeat the method.

When it is determined by the energy controller 41 that the alternating current outputted by the inverter 2 is insufficient, the energy controller 41 further determines whether the alternating current is zero in step S46. When it is determined by the energy controller 41 that the alternating current is non-zero, the flow proceeds to step S47. Otherwise, the flow proceeds to step S49.

In step S49, the energy controller 41 determines whether the determination that the alternating current is zero has been made for a number of consecutive times (e.g., three times). When the determination is affirmative, the flow goes to step S48. Otherwise, the flow goes back to step S21' in an attempt to activate the air conditioner outdoor unit 3.

In step S47, the energy controller 41 switches the air conditioner outdoor unit 3 to the inactive state, and temporarily suspends the process of the method. Additionally, the energy controller 41 may generate the alert message indicating that the air conditioner outdoor unit 3 cannot obtain enough power for operation.

Similar to step S216 of FIG. 3, in response to receipt of the resume signal, the flow proceeds to step S48, in which the energy controller 41 resumes the process of the method, and then the flow goes back to step S1.

Figure 11:
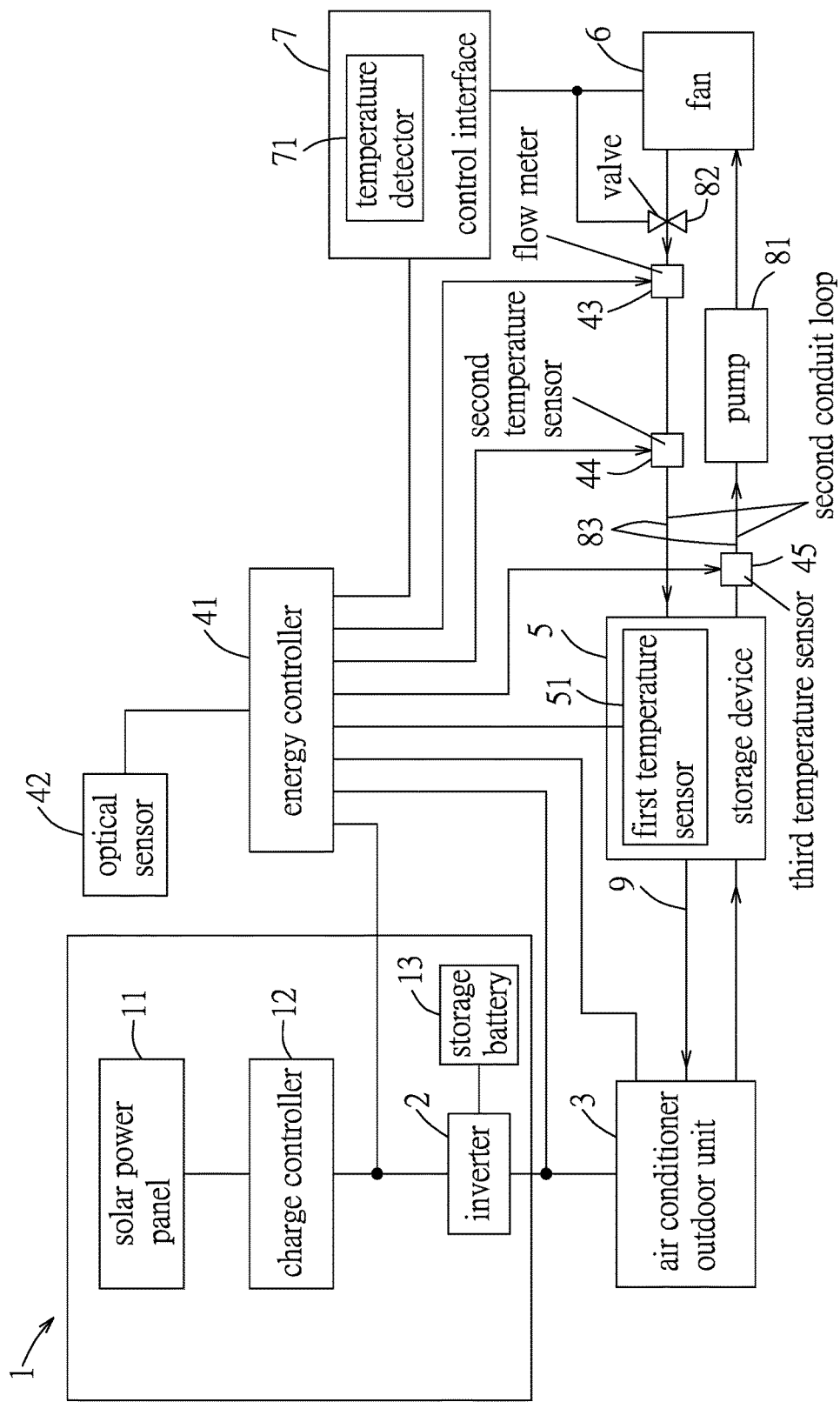
FIG. 11 is a block diagram illustrating the control mechanism with an air conditioning system that includes an off-grid system according to one embodiment of the disclosure.

FIG. 11 is a block diagram illustrating a solar power module 1" that is embodied using an off-grid system, according to one embodiment of the disclosure. The solar power module 1" as depicted in this embodiment is not electrically connected to the power source (i.e., the mains electricity). As a result, when the energy controller 41 determines that the sunlight is insufficient according to the luminance and the temperature of the sunlight detected by the optical sensor 42, the energy controller 41 switches the air conditioner outdoor unit 3 to the inactive state.

In some embodiments, the control mechanism 4 may further include a communication interface that is capable of communicating with a remote computer host. In this configuration, the energy controller 41 is enabled to transmit the various parameters to the computer host, and the computer host may transmit signals to the energy controller 41 for directing the same to control the air conditioning system using the rules as described above.

In the embodiments above, the air conditioning system is employed for cooling the air in the space in which the fan 6 is disposed. In the cases where the air conditioning system is employed for heating the air in the space, a method similar to the above embodiments may be applied with some modifications of the rules. Specifically, the relationships regarding the temperatures may be reversed. Taking the previously mentioned first rule as an example, the energy controller 41 may control the air conditioner outdoor unit 3 to remain in the active state when the temperature sensed by the first temperature sensor 51 is smaller than the third threshold temperature.

To sum up, by electrically connecting the control mechanism 4 to various components of the air conditioning system, the energy controller 41 is able to obtain various parameters for determining an appropriate operation state of the air conditioner outdoor unit 3. As a result, a frequency in which the air conditioner outdoor unit 3 switches between the two operation states may be reduced, and a seasonal energy efficiency ratio (SEER) of the air conditioning system may be elevated. In addition, the energy controller 41 is capable of detecting malfunctions occurring in the components of the solar power module 1, 1', 1" and the air conditioning system.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A control mechanism for controlling an air conditioning system, the air conditioning system including a solar power module for converting sunlight into electrical energy, an air conditioner outdoor unit electrically connected to and powered by the solar power module, a storage device containing a first liquid for performing heat exchange with the air conditioner outdoor unit via a first conduit loop, a temperature sensor for detecting a temperature of the first liquid in the storage device, and a fan for distributing conditioned air that exchanges heat with the storage device via a second liquid through a second conduit loop, said control mechanism comprising:
   an optical sensor that is configured to be disposed close to the solar power module for detecting a luminance and a temperature of the sunlight received by the solar power module; and
   an energy controller that is electrically connected to said optical sensor, that is configured to be electrically connected to the solar power module, the air conditioner outdoor unit and the temperature sensor, and that is capable of controlling an operation state of the air conditioner outdoor unit to switch between an active state and an inactive state based on
      the luminance and the temperature of the sunlight detected by said optical sensor,
      an operation state of the fan,
      a current operation state of the air conditioner outdoor unit,
      a flow speed of the second liquid in the second conduit loop,
      a first temperature of the second liquid at a portion of the second conduit loop where the second liquid flows out of the storage device,
      a second temperature of the second liquid at a portion of the second conduit loop where the second liquid flows into the storage device, and
      a relation among the temperature of the first liquid sensed by the temperature sensor and a first threshold temperature, a second threshold temperature and a third threshold temperature.

2. The control mechanism of claim 1, wherein the first threshold temperature is larger than a phase transition temperature of the first liquid, the second threshold temperature is smaller than the phase transition temperature of the first liquid, and the third threshold temperature is smaller than the second threshold temperature.

3. The controlling mechanism of claim 2, wherein under the circumstance that said energy controller determines the sunlight to be sufficient according to the luminance and the temperature of the sunlight detected by said optical sensor and that the air conditioner outdoor unit is in the active state:
   when the temperature sensed by the temperature sensor is larger than the third threshold temperature, said energy controller controls the air conditioner outdoor unit to remain in the active state; and
   when the temperature sensed by the temperature sensor is smaller than the third threshold temperature, said energy controller switches the air conditioner outdoor unit to the inactive state.

4. The control mechanism of claim 2, wherein, under the circumstance that said energy controller determines the sunlight to be sufficient according to the luminance and the temperature of the sunlight detected by said optical sensor and that the air conditioner outdoor unit is in the inactive state:
   when the temperature sensed by the temperature sensor is larger than the first threshold temperature, said energy controller switches the air conditioner outdoor unit to the active state; and
   when the temperature sensed by the temperature sensor is smaller than the third threshold temperature, said energy controller controls the air conditioner outdoor unit to remain in the inactive state.

5. The control mechanism of claim 2, wherein, under the circumstance where said energy controller determines that the sunlight is sufficient according to the luminance and the temperature of the sunlight detected by said optical sensor, where the air conditioner outdoor unit is in the inactive state, and where the temperature sensed by the temperature sensor is between the first threshold temperature and the second threshold temperature, said energy controller is programmed to:
  obtain an idle time duration for which the air conditioner outdoor unit remains in the inactive state;
  calculate an amount of heat expended by the first liquid based on the flow speed of the second liquid in the second conduit loop, the first temperature of the second liquid and the second temperature of the second liquid that are detected the last time the air conditioner outdoor unit operates in the active state;
  calculate an estimated time duration for which the first liquid in the storage device is still able to store heat for decreasing the temperature of the first liquid while the air conditioner outdoor unit is in the active state, based on the amount of heat expended by the first liquid and the temperature of the first liquid in the storage device;
  switch the air conditioner outdoor unit to the active state when the idle time duration is longer than a first predetermined time duration and the estimated time duration is longer than a second predetermined time duration; and
  control the air conditioner outdoor unit to remain in the inactive state when at least one of the following is true: i) the idle time duration is shorter than the first predetermined time duration; and ii) the estimated time duration is shorter than the second predetermined time duration.

6. The control mechanism of claim 2, wherein:
  under the circumstance where said energy controller determines that the sunlight is sufficient according to the luminance and the temperature of the sunlight detected by said optical sensor, where the air conditioner outdoor unit is in the inactive state, and where the temperature of the first liquid in the storage device sensed by the temperature sensor is smaller than the second threshold temperature, said energy controller controls the air conditioner outdoor unit to remain in the inactive state.

7. The control mechanism of claim 2, the solar power module being implemented using one of an on-grid system and a hybrid system,
  under the circumstance where said energy controller determines that the sunlight is insufficient according to the luminance and the temperature of the sunlight detected by said optical sensor, where the fan is in an active state, and where the temperature of the first liquid in the storage device sensed by the temperature sensor is larger than the first threshold temperature, said energy controller switches the air conditioner outdoor unit to the active state.

8. The control mechanism of claim 7, wherein, under the circumstance where said energy controller determines that the sunlight is insufficient according to the luminance and the temperature of the sunlight detected by said optical sensor, where the fan is in the active state, where the air conditioner outdoor unit is in the active state, and where the temperature of the first liquid in the storage device sensed by the temperature sensor is between the first threshold temperature and the second threshold temperature, said energy controller is programmed to:
  obtain an operating time duration in which the air conditioner outdoor unit remains in the active state;
  calculate an estimated time duration in which the storage device is able to release heat in order to decrease the temperature of air blown by the fan while the fan is in the active state, based on an amount of heat expended in the storage device and the temperature sensed by the temperature sensor, wherein the amount of heat expended is calculated based on the flow speed of the second liquid in the second conduit, the temperature of the second liquid exiting the storage device, and the temperature of the second liquid entering the storage device that are detected while the air conditioner outdoor unit is in the active state;
  switch the air conditioner outdoor unit to the inactive state when the estimated time duration is longer than a first predetermined time duration and the operating time duration is longer than a second predetermined time duration; and
  control the air conditioner outdoor unit to remain in the active state when at least one of the following relations is true: i) the estimated time duration is shorter than the first predetermined time duration; and ii) the operating time duration is shorter than the second predetermined time duration.

9. The control mechanism of claim 2, the solar power module being implemented using one of an on-grid system and a hybrid system, wherein:
  under the circumstance where said energy controller determines that the sunlight is insufficient according to the luminance and the temperature of the sunlight detected by said optical sensor, where the fan is in an active state, where the air conditioner outdoor unit is in the inactive state, and where the temperature of the first liquid in the storage device sensed by the temperature sensor is between the first threshold temperature and the second threshold temperature, said energy controller controls the air conditioner outdoor unit to remain in the inactive state.

10. The control mechanism of claim 2, the solar power module being implemented using one of an on-grid system and a hybrid system,
  wherein, under the circumstance where said energy controller determines that the sunlight is insufficient according to the luminance and the temperature of the sunlight detected by said optical sensor, and where the temperature of the first liquid in the storage device sensed by the temperature sensor is smaller than the second threshold temperature, said energy controller switches the air conditioner outdoor unit to the inactive state.

11. The control mechanism of claim 2, the solar power module being implemented using one of an on-grid system and a hybrid system, wherein under the circumstance where said energy controller determines that the sunlight is insufficient according to the luminance and the temperature of the sunlight detected by said optical sensor, where the fan is in an inactive state, where the air conditioner outdoor unit is in the active state, and where the temperature of the first liquid in the storage device sensed by the temperature sensor is larger than the second threshold temperature, said energy controller is programmed to:
  obtain an operating time duration for which the air conditioner outdoor unit remains in the active state;
  switch the air conditioner outdoor unit to the inactive state when the operating time duration is longer than a predetermined time duration; and control the air conditioner outdoor unit to remain in the active state when the operating time duration is shorter than the predetermined operating duration.

12. The control mechanism of claim 2, the solar power module being implemented using one of an on-grid system and a hybrid system,
   wherein under the circumstance where said energy controller determines that the sunlight is insufficient according to the luminance and the temperature of the sunlight detected by said optical sensor, where the fan is in an inactive state, where the air conditioner outdoor unit is in the inactive state, and where the temperature of the first liquid in the storage device sensed by the temperature sensor is larger than the second threshold temperature, said energy controller is programmed to control the air conditioner outdoor unit to remain in the inactive state.

13. The control mechanism of claim 2, the solar power module being implemented using an off-grid system, wherein under the circumstance that said energy controller determines that the sunlight is insufficient according to the luminance and the temperature of the sunlight detected by said optical sensor, said energy controller is programmed to switch the air conditioner outdoor unit to the inactive state.

14. The control mechanism of claim 2, the air conditioning system further including a control interface capable of communicating with the fan and said energy controller, wherein:
   in response to receipt of an activate signal from the control interface, said energy controller is programmed to force the air conditioner outdoor unit to operate in the active state, and then compare the temperature of the first liquid in the storage device sensed by the temperature sensor and the second threshold temperature; and
   when it is determined that the temperature of the first liquid in the storage device sensed by the temperature sensor is smaller than the second threshold temperature, said energy controller is programmed to switch the air conditioner outdoor unit to the inactive state.

* * * * *